(12) United States Patent
Jacob (10) Patent No.: US 7,865,647 B2
(45) Date of Patent: Jan. 4, 2011

(54) EFFICIENT RESOURCE ARBITRATION

(75) Inventor: Rojit Jacob, Sunnyvale, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

(21) Appl. No.: 11/616,539

(22) Filed: Dec. 27, 2006

(65) Prior Publication Data

US 2008/0162760 A1 Jul. 3, 2008

(51) Int. Cl.
*G06F 13/364* (2006.01)
*G06F 13/14* (2006.01)
*G06F 13/26* (2006.01)
*G06F 13/38* (2006.01)

(52) U.S. Cl. .................. 710/244; 710/113; 710/116; 710/241

(58) Field of Classification Search ........... 710/110, 710/244
See application file for complete search history.

(56) References Cited

U.S. PATENT DOCUMENTS

| | | | |
|---|---|---|---|
| 5,392,434 A | 2/1995 | Bryant et al. | |
| 5,418,967 A | 5/1995 | Simcoe et al. | |
| 5,485,586 A | 1/1996 | Brash et al. | |
| 5,564,062 A * | 10/1996 | Meaney et al. | 710/244 |
| 6,170,032 B1 * | 1/2001 | Izzard | 710/244 |
| 6,516,369 B1 * | 2/2003 | Bredin | 710/111 |
| 6,877,053 B2 * | 4/2005 | Lahiri et al. | 710/113 |
| 6,954,844 B2 | 10/2005 | Lentz et al. | |
| 7,120,714 B2 | 10/2006 | O'Connor et al. | |
| 7,181,561 B2 * | 2/2007 | Barth et al. | 710/310 |
| 7,249,210 B2 * | 7/2007 | Ganasan et al. | 710/117 |
| 7,395,360 B1 * | 7/2008 | Pritchard et al. | 710/113 |
| 2005/0060457 A1 | 3/2005 | Olukotun | |
| 2008/0077721 A1 * | 3/2008 | Terakawa | 710/240 |

OTHER PUBLICATIONS

International Search Report of the International Searching Authority for Application No. PCT/US2007/088351, mailed on Sep. 26, 2008, 1 page.
Written Opinion of the International Searching Authority for Application No. PCT/US2007/088351, mailed on Sep. 26, 2008, 6 pages.
Preliminary Report on Patentability for Application No. PCT/US2007/088351, dated Jun. 30, 2009, 7 pages.

* cited by examiner

*Primary Examiner*—Ryan M Stiglic
(74) *Attorney, Agent, or Firm*—Townsend and Townsend and Crew LLP (57) ABSTRACT

Resource requests are allocated by storing resource requests in a queue slots in a queue. A token is associated with one of the queue slots. During an arbitration cycle, the queue slot with the token is given the priority to the resource. If the queue slot with the token does not include a request, a different queue slot having the highest static priority and including a request is given access to the resource. The token is advanced to a different queue slot after one or more arbitration cycles. Requests are assigned to the highest priority queue slot, to random or arbitrarily selected queue slots, or based on the source and/or type of the request. One or more queue slots may be received for specific sources or types of requests. Resources include processor access, bus access, cache or system memory interface access, and internal or external interface access.

32 Claims, 6 Drawing Sheets

EFFICIENT RESOURCE ARBITRATION

BACKGROUND OF THE INVENTION

This application relates to the field of microprocessors and microprocessor systems, and specifically to techniques for allocating resources between competing resource requests. Resources in microprocessors and microprocessor systems are often constrained. For example, a system memory interface is constrained by the bandwidth of the system memory and the memory bus. Similarly, a thread or task scheduler is constrained by the maximum number of threads capable of being processed simultaneously by a microprocessor. In another example, a cache memory controller may be configured to service critical requests first and be constrained by the number of spare cache access cycles available for non-critical cache accesses.

Multiple resource requests can come from the same entity or a different entity within a microprocessor or microprocessor system. For example, a single processor core may issue multiple requests for data from system memory to a system memory interface. In another example, multiple processor cores operating independently within a microprocessor may issue multiple requests for data from system memory to a system memory interface.

Regardless of the source or sources of the resource requests, the entity receiving the requests (such as a communications bus controller, a system memory interface, a cache memory controller, a thread or task scheduler, or any other resource in a microprocessor or microprocessor system) must efficiently allocate resources (such as cache or system memory accesses, data communications bus accesses, and processing resources) between multiple resource requests. For example, a cache memory controller within a microprocessor may receive multiple requests to write data in a cache memory. The cache memory controller must determine which pending or outstanding requests to service immediately and which to defer for a later time.

There are many different arbitration schemes previously used to allocate resources. One of the simplest is a first-come, first-served arbitration scheme. In this scheme, resource requests are processed in the order they are received. A fixed priority scheme assigns a static priority to different requests and services the requests in order of priority. Although this scheme is simple to implement, it can allow one requester to monopolize resources. This leads to resource starvation for the other requesters. A round-robin arbitration scheme assigns resources to each requester in equal portions and in order. Although this prevents resource starvation, it is also less efficient as resources may be allocated to requester even if they do not have any pending requests. Additionally, round-robin arbitration does not allow pending requests to be prioritized.

Other arbitration schemes can use weighting or other prioritization techniques to improve efficiency. However, these schemes are complicated. In many microprocessor and microprocessor systems, the arbitration scheme is implemented using logic circuits and other hardware. The complexity of these other arbitration schemes often requires substantial amounts of logic circuits to implement with hardware, making these schemes unsuitable for microprocessors and microprocessor systems, where device area is scarce.

It is therefore desirable for an arbitration scheme to provide improved resource utilization, eliminate resource starvation, and allow for request prioritization. It is further desirable for the arbitration scheme to be implemented in hardware using minimal additional logic circuits as compared with first-come, first-served and round-robin arbitration schemes. It is also desirable for the arbitration scheme to be adaptable to a wide variety of applications within microprocessors and microprocessor systems.

BRIEF SUMMARY OF THE INVENTION

An embodiment of the invention allocates resources to resource requests by storing pending resource requests in queue slots in a queue. A token is associated with one of the queue slots. During an arbitration cycle, the queue slot with the token is given the highest priority to the resource. If the queue slot with the token does not include a pending resource request, a different queue slot having the highest static priority and including a pending resource request is given access to the resource. The token is advanced to a different queue slot after one or more arbitration cycles. In an embodiment, the sequence of queue slots in the queue correspond with the static priority of the queue slots, such that the first queue slots have the highest priority and the last queue slots have the lowest priority.

In an embodiment, pending resource requests are assigned to the first available queue slot in the queue. In another embodiment, resource requests are assigned to random or arbitrarily selected available queue slots. In another embodiment, resource requests are assigned to the queue slots in the queue based on the source and/or type of the request. One or more queue slots may be reserved for particular sources or types of resource request.

Embodiments of the invention can be implemented to allocate resources such as processor access for processing tasks, bus access, cache or system memory interface access, and internal or external interface access.

BRIEF DESCRIPTION OF THE DRAWINGS

The invention will be described with reference to the drawings, in which.

DETAILED DESCRIPTION OF THE INVENTION

Figure 1:
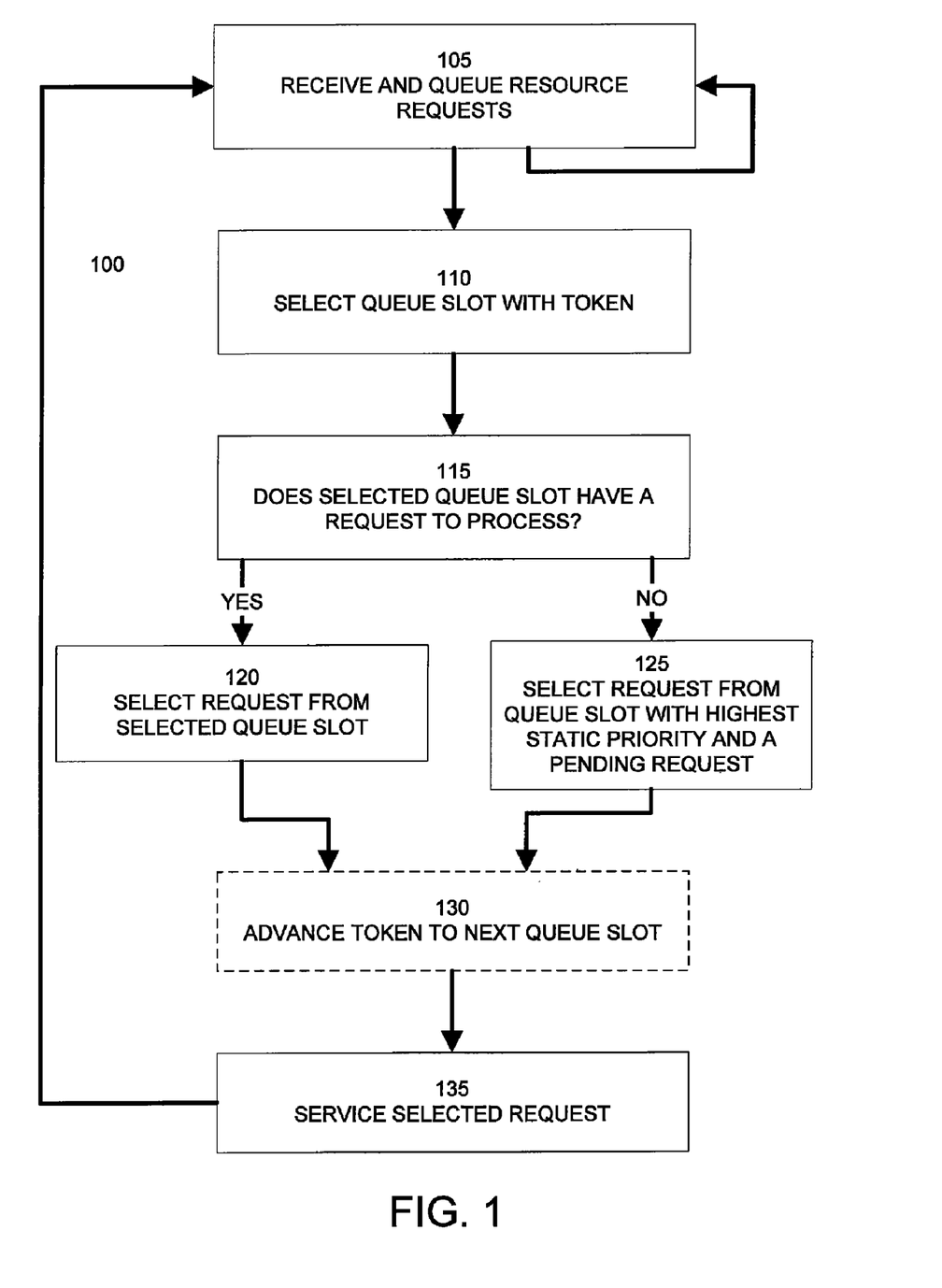
FIG. 1 illustrates a method of allocating resources to resource requests according to an embodiment of the invention.

FIG. 1 illustrates a method 100 of allocating resources to resource requests according to an embodiment of the invention. Method 100 begins with step 105, which receives and queues resource requests. Resource requests can be received from one or more entities in the microprocessor or microprocessor system. Moreover, each entity in the microprocessor or microprocessor system may issue multiple resource requests before receiving any responses.

As resource requests are received, an embodiment of step 105 assigns each resource request to an available queue slot. In one embodiment, step 105 assigns resource requests to the first available queue slot in the queue. In another embodiment, step 105 assigns resource requests to random or arbitrarily selected available queue slot in the queue. In another embodiment, step 105 assigns resource requests to the queue slots in the queue based on the source of the request. For example, resource requests received from higher priority entities can be assigned to available queue slots at the front of the queue, while resource requests received from lower priority entities can be assigned to available queue slots at the back of the queue. In a further embodiment, step 105 assigns resource requests to the queue slots in the queue based on the type of the request, for example, with high priority resource requests assigned to available queue slots at the front of the queue and lower priority resource requests assigned to available queue slots at the back of the queue.

In one embodiment, selection of one of the identified queue slots having a static priority corresponding with the priority of the source includes, in part, determining if a first one of the queue slots reserved for the source is available to store resource requests, selecting the first one of the queue slots in response to the determination that the first one of the queue slots reserved for the source is available to store resource requests, and selecting a different one of the identified queue slots in response to the determination that the first one of the queue slots reserved for the source is not available to store resource requests.

Step 105 can be repeated as often as necessary until a resource becomes available and an arbitration cycle is initiated. An arbitration cycles selects one or more pending requests to be serviced by a resource in a microprocessor or microprocessor system. In an embodiment, step 105 initiates an arbitration cycle whenever the resource is available to service at least one pending request. For example, a cache memory controller may initiate an arbitration cycle whenever there is a spare cache memory access cycle to refill the cache memory with recently retrieved data. In another example, a bus controller may initiate an arbitration cycle whenever the data communications bus is available to carry data.

Following step 105, step 110 selects a queue slot associated with a token. In an embodiment, a token is associated with one of the queue slots. In an embodiment, the token is represented by a single bit value. As discussed in detail below, the token is passed from one queue slot to another queue slot during each arbitration cycle. The queue slot currently associated with the token has the highest priority for a resource.

Step 115 determines if the selected queue slot, which is the queue slot currently associated with the token, has a pending resource request. If so, step 120 selects the resource request from this queue slot.

Conversely, if step 115 determines that the selected queue slot does not have a pending resource request, step 125 selects a pending request from the queue slot with the highest static priority. In an embodiment, each queue slot is associated with a static priority value. For example, the first queue slot may be assigned the highest priority, the second queue slot may be assigned the second highest priority, and so forth, such that the last queue slot is assigned the lowest priority. In this embodiment, step 125 will select the highest priority queue slot (i.e. the queue slot closest to the front of the queue) that also has a pending resource request.

Following step 120 or step 125, step 130 optionally advances the token to the next queue slot. In an embodiment, the token is advanced by one to the queue slot following the currently selected queue slot. If the token is currently at the last queue slot, an embodiment of step 130 will advance the token back to the first queue slot. By advancing the token, method 100 ensures that every queue slot will have the highest priority at least some of the time.

In another embodiment of step 130, the token may not advance during every arbitration cycle. Instead, the token advances every other arbitration cycle, every third arbitration cycle, or some other multiple of arbitration cycles. In this embodiment, more priority is given to queue slots at the front of the queue; however, each queue slot will still have the highest priority at least some of the time. By increasing the number of arbitration cycles between each token advancement, method 100 increases the amount of resources allocated to resource requests at the front of the queue. Decreasing the number of arbitration cycles between each token advancement causes method 100 to allocate resources more evenly between all queue slots (and hence all sources of resource requests).

Step 135 then forwards the selected resource request for servicing. In an embodiment, step 135 may forward the data associated with the resource request to a memory interface, a system interface, a processor core or other data processing circuit, or any other hardware performing a function in a microprocessor or microprocessor system. Step 135 also removes the selected resource request from the queue, making its queue slot available for storing further resource requests received at a later time. Following step 135, method 100 may return to step 105 to receive one or more additional resource requests prior to the initiation of another arbitration cycle.

Figure 2:
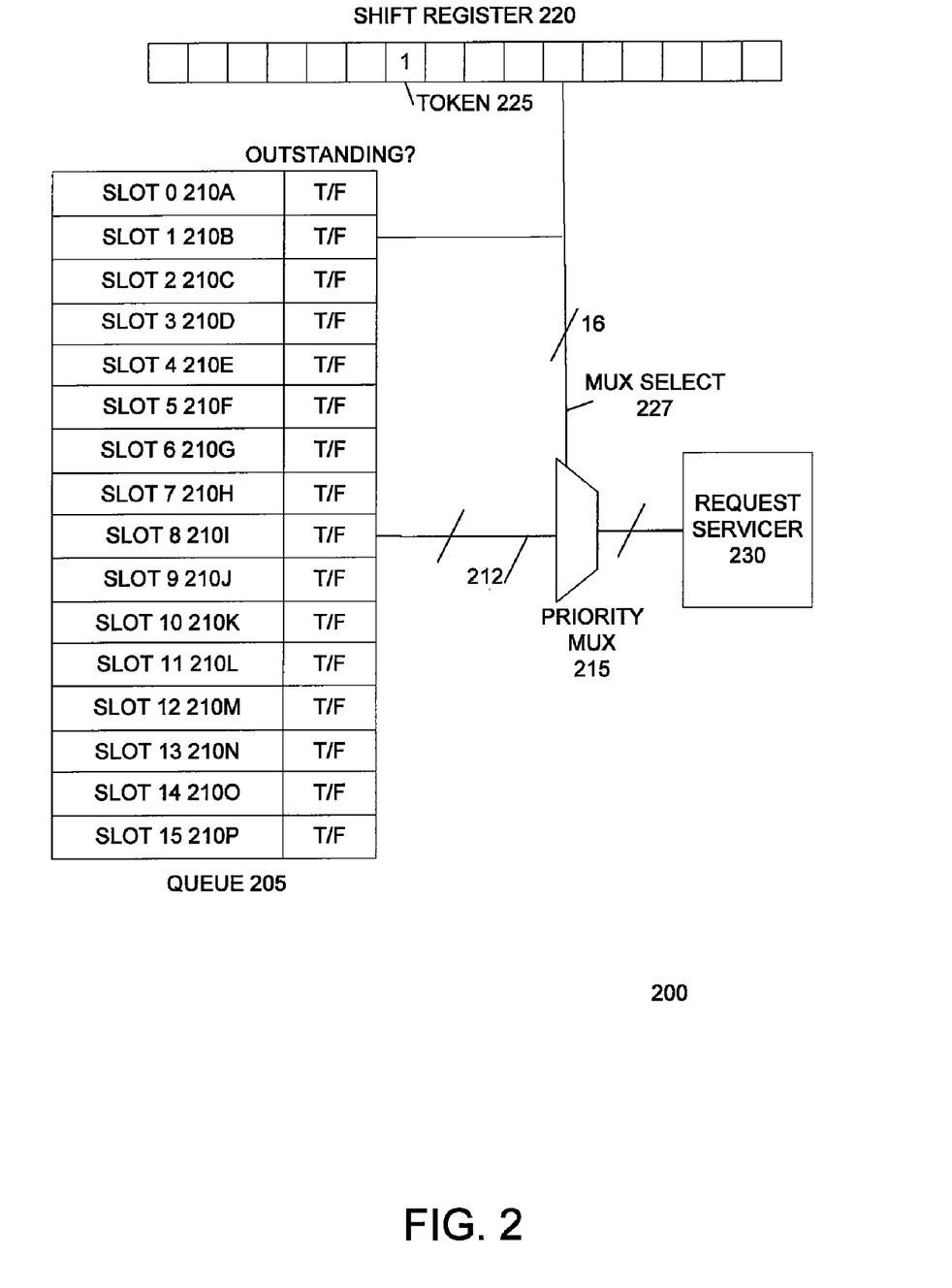
FIG. 2 illustrates an example hardware implementation of an embodiment of the invention.

FIG. 2 illustrates an example hardware implementation 200 of an embodiment of the invention. Hardware implementation 200 includes a request queue 205 to store pending resource requests. In an embodiment, the request queue includes a set of data registers 210. Each of the set of data registers 210 corresponds with a queue slot. The set of data registers 210 can be of any size required for the intended application and this size may take into account the maximum potential number of outstanding resource requests, the number of entities requesting the resource, the rate that resources may be requested, and the rate that resource requests may be serviced. For example, the set of data registers 210 may include sixteen data registers 210A to 210P.

Each of the data registers 210 includes a first field adapted to store data and/or instruction associated with a resource request and a second field adapted to store a flag or bit value indicating whether the data register is currently storing a pending resource request, is available to store an incoming resource request, or any other state associated with a resource request.

The request queue is connected with a priority multiplexer 215 via a bus 212. The priority multiplexer 215 selects one resource request from one of the data registers 210 of the request queue 205 and forwards the selected resource request to a request servicer module 230, which provides access to the resource in response to the selected resource request.

In an embodiment, a shift register 220 is used to associate a token 225 with one of the data registers 210 corresponding with queue slots. Shift register 220 includes one bit for each of the data registers 210. The shift register 220 is initialized with one bit being set to a value representing the token, such as a "1", and the other bits of the shift register 220 set to the opposite value, such as a "0". During each arbitration cycle, the location of the token in the shift register 220 indicates the data register (and hence the queue slot) with the token. For example, if the first bit of the shift register 220 has the token 225, then data register 210A represents the queue slot with the token. Similarly, if the seventh bit of the shift register 200 has the token 225 (as shown in FIG. 2), then the data register 210G represents the queue slot with the token.

As described in method 100 above, the token can be assigned to a different queue slot during each arbitration cycle (or after multiple arbitration cycles in other embodiments). To accomplish this, hardware implementation 200 shifts the value representing the token 225 to an adjacent bit of the shift register 220 during each arbitration cycle (or after multiple arbitration cycles in other embodiments). When the token 225 is at the last bit of the shift register 220, an embodiment of shift register 220 will move the token 225 back to the first bit of the shift register 220 for the next arbitration cycle.

The shift register 220 includes one or more outputs that indicate the position of the token 225 within the shift register 220. In an embodiment, each bit of the shift register 220 is associated with a corresponding output indicating the value of that bit. The outputs of the shift register 220 are connected with at least a portion of the selection lines 227 of the priority multiplexer 215. In an embodiment, another portion of the selection lines 227 of the priority multiplexer 215 are connected with the second field of each of the data registers 210, which indicate whether the data registers 210 have a pending resource request.

In an embodiment, the priority multiplexer 215 selects a resource request from one of the data registers 210 in request queue 205 based on the values of the selection lines 227 as follows. If the data register corresponding with the current token position in the shift register 220 has a pending resource request, as indicated by its second field value, then the priority multiplexer 215 selects the resource request from this data register for servicing. If the data register corresponding with the current token position in the shift register 220 does not have a pending resource request, as indicated by its second field value, then the priority multiplexer 215 selects the first or highest priority data register in the request queue 205 that does have a pending resource request. The resource request in the selected data register is then provided to the request servicer 230.

Once a resource request in a data register has been provided to the request servicer 230, the flag or bit value of the second field of the selected data register is cleared to indicate that this resource request is no longer pending. In a further embodiment, an incoming resource request can overwrite the value of this data register. The flag or bit value of the second field of the data register is then set upon storing a newly received resource request.

In further embodiments, the shift register 220 may hold two or more tokens, rather than a single token. In these embodiments, each data register associated with one of the current token locations is given priority access to the resource. If one or more of these data registers associated with current token locations do not have pending resource requests, one or more resource requests from other data registers are selected in order of priority in the request queue 205. These further embodiments can be used when the request servicer 230 is capable of servicing two or more resource requests in parallel. For example, if the resource is access to a dual port memory bank, then two tokens can be used to select two resource requests for servicing during each arbitration cycle.

Figure 3:
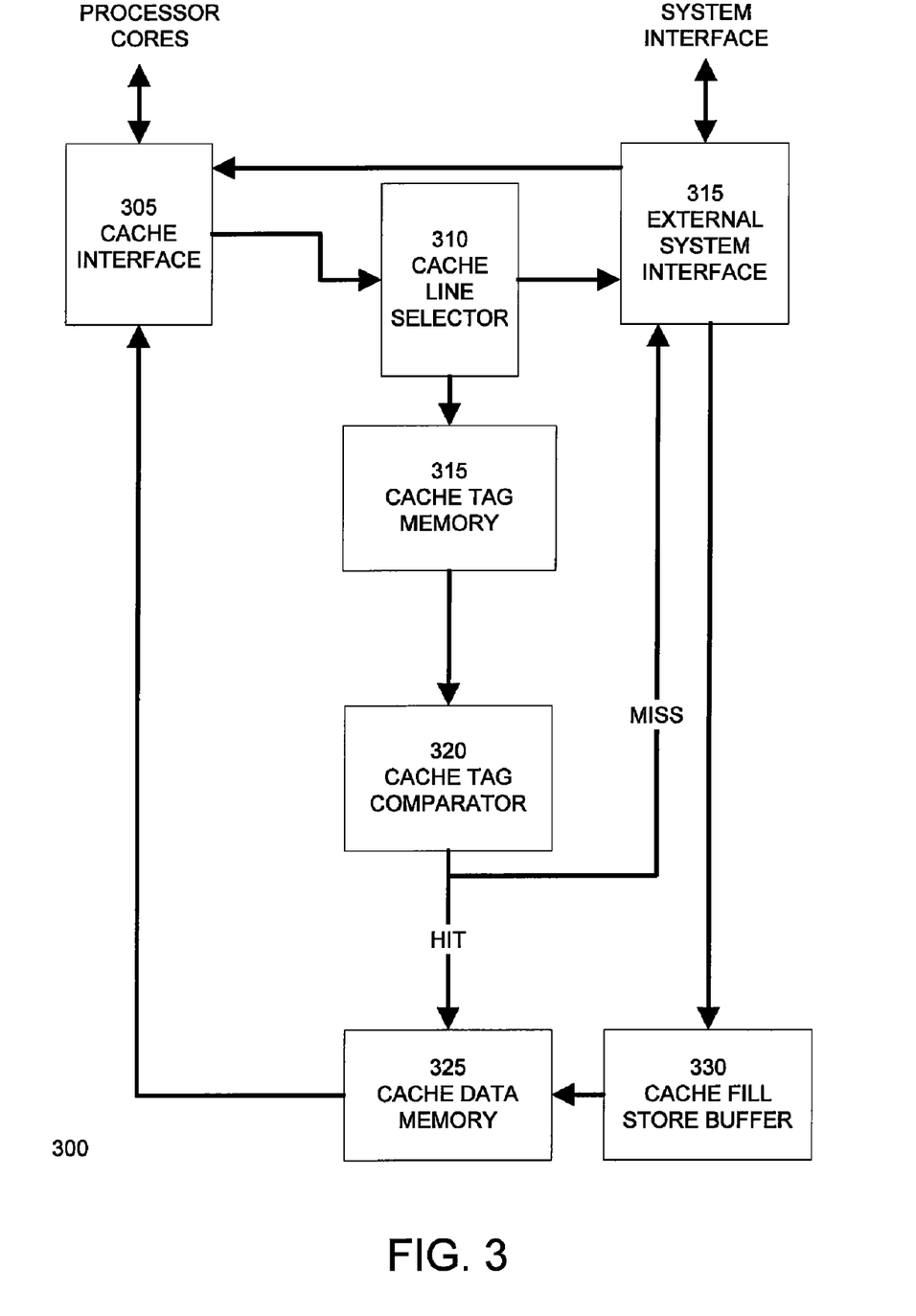
FIG. 3 illustrates an example cache memory controller suitable for use with an embodiment of the invention.

The arbitration method and hardware implementation can be adapted for a wide variety of applications in microprocessors and microprocessor systems. FIG. 3 illustrates an example cache memory controller 300 suitable for use with an embodiment of the invention. Cache memory controller 300 includes a cache interface 305 adapted to receive data requests from one or more processor cores.

For each data request, a cache line selector 310 selects one or more cache lines potentially storing the requested data. If the cache line selector 310 initially determines that the cache does not store data corresponding with the data request, such as if the data request corresponds to a memory address range that is not cached, then the data request is forwarded to the external system interface 315, so that the data can be fetched from memory or another part of the microprocessor system.

If the cache line selector 310 selects one or more cache lines for the data request, then cache tag data corresponding with the selected cache lines is retrieved from the cache tag memory 315. The cache tag comparator 320 compares cache tag data with tag data from the data request to determine if one of the selected cache lines includes a copy of the requested data, referred to as a cache hit.

If the cache tag comparator 320 determines that there is a cache hit, then the requested data is retrieved from the cache data memory 325 and provided to the cache interface 305 for return to the requesting processor core.

Conversely, if the cache tag comparator 320 determines that none of the selected cache lines includes a copy of the requested data, referred to as a cache miss, then the data request is provided to the external system interface 315, so that the data can be fetched from memory or another part of the microprocessor system.

When data from memory or another part of the microprocessor system is returned to the cache memory controller 300, this data is provided to the cache interface 305 to be returned to the processor core. Additionally, the returned data can be provided to a cache fill store buffer 330. The cache fill store buffer 330 temporarily holds data to be stored in the cache data memory 325.

An embodiment of the invention uses the arbitration method and hardware implementation discussed above to select data from the cache fill store buffer 330 to store in the cache data memory. In this embodiment, an arbitration cycle is initiated when the cache data memory 325 has a spare memory access cycle available to store data, such as when processor cores are not reading or writing to the cache data memory 325.

Similar to the embodiments discussed above, a token is associated with one of the entries of the cache fill store buffer 330. Control logic of the cache fill store buffer 330 selects the entry of the cache fill store buffer 330 associated with the token. If the selected entry of the cache fill store buffer 330 is holding data to be stored in the cache data memory 325, then the control logic writes this data to the cache data memory 325. If the selected entry of the cache fill store buffer 330 does not hold data to be written to the cache data memory 325, then the control logic selects pending data from the highest priority entry of the cache fill store buffer 330. In an embodiment, the token is shifted to a different entry of the cache fill store buffer 330 at the end of the arbitration cycle, so that this different entry has priority access to the cache data memory 325 during the next arbitration cycle.

Figure 4:
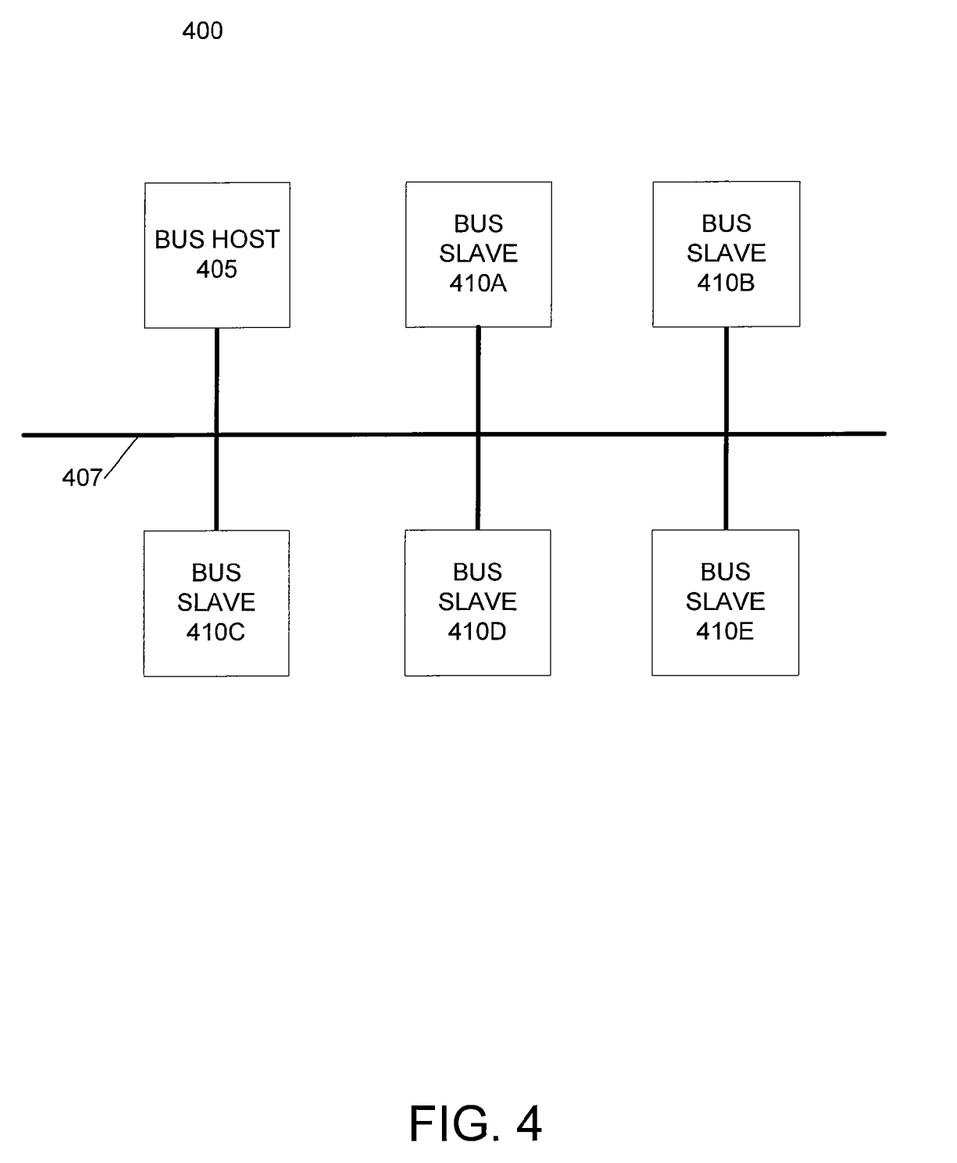
FIG. 4 illustrates a data communications bus system suitable for use with an embodiment of the invention.

FIG. 4 illustrates a data communications bus system 400 suitable for use with an embodiment of the invention. Data communications bus system 400 can be located entirely within a microprocessor, such as in multiple core microprocessors, system on a chip (SoC) systems, microcontrollers, and application specific integrated circuits (ASICs). Data communications bus system 400 can also be comprised of two or more separate integrated circuits or other devices connected by an electrical, optical, wireless, or other type of data communications connection.

An embodiment of the data communications bus system 400 includes a bus host 405 connected with a data bus or other data communications connection 407. Additionally, the data communications bus system 400 includes one or more bus slaves 410, such as bus slaves 410A-410E. In an embodiment, the bus host 405 is responsible for directing communications over the data bus 407. In other embodiments, the responsibility for directing communications over data bus 407 is shared by the bus host 405 and one or more bus slaves 410.

An embodiment of the bus host 405 receives bus access requests from one or more bus slaves. The bus host 405 uses the method 100 discussed above to allocate bus access between two or more competing bus access request. In this embodiment, a token is associated with one of the bus slaves 410. During an arbitration cycle, if the bus slave associated with the current token position has a pending bus access request, then the bus host 405 allocates the bus 407 to this bus slave. Otherwise, bus access is provided to the bus slave with the highest priority in a bus access queue. The token is then advanced to assign a different bus slave priority for the next arbitration cycle.

Figure 5:
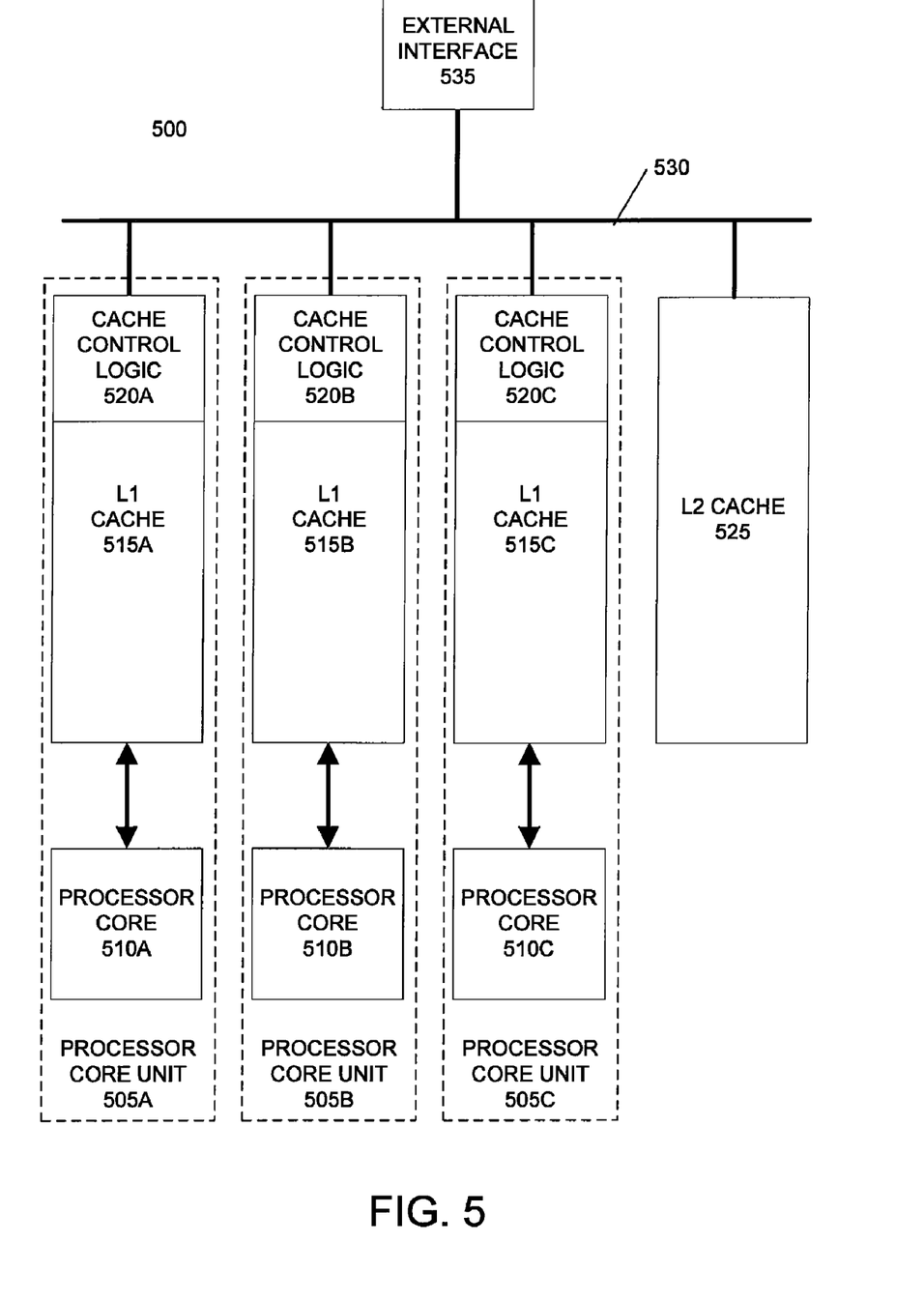
FIG. 5 illustrates a microprocessor suitable for use with an embodiment of the invention.

FIG. 5 illustrates an example microprocessor 500 suitable for use with an embodiment of the invention. Processor 500 includes an L2 cache memory 510 to improve processor performance. In an embodiment, the L2 cache memory 510 includes a cache controller such as cache controller 300 described above. Embodiments of example processor 500 include two or more processor core units 505, such as processor core units 505A, 505B, and 505C. Additionally, processor core units 505 are connected via at least one data bus 525 with each other and with external interface 530.

In an embodiment, L2 cache memory 510 is connected to processor core units 505 via data bus 525. In this embodiment, L2 cache memory 510 is shared with two or more of the processor core units 505. L2 cache memory 510 can store data potentially needed by one or more of the processor core units 505.

In an embodiment, the processor core units 505 each include L1 cache memories and associated cache control logic 530, such as L1 cache memories 530A, 530B, and 530C. An embodiment of the L1 cache memories and associated cache control logic 530 includes cache controllers similar to cache controller 300 discussed above.

Figure 6:
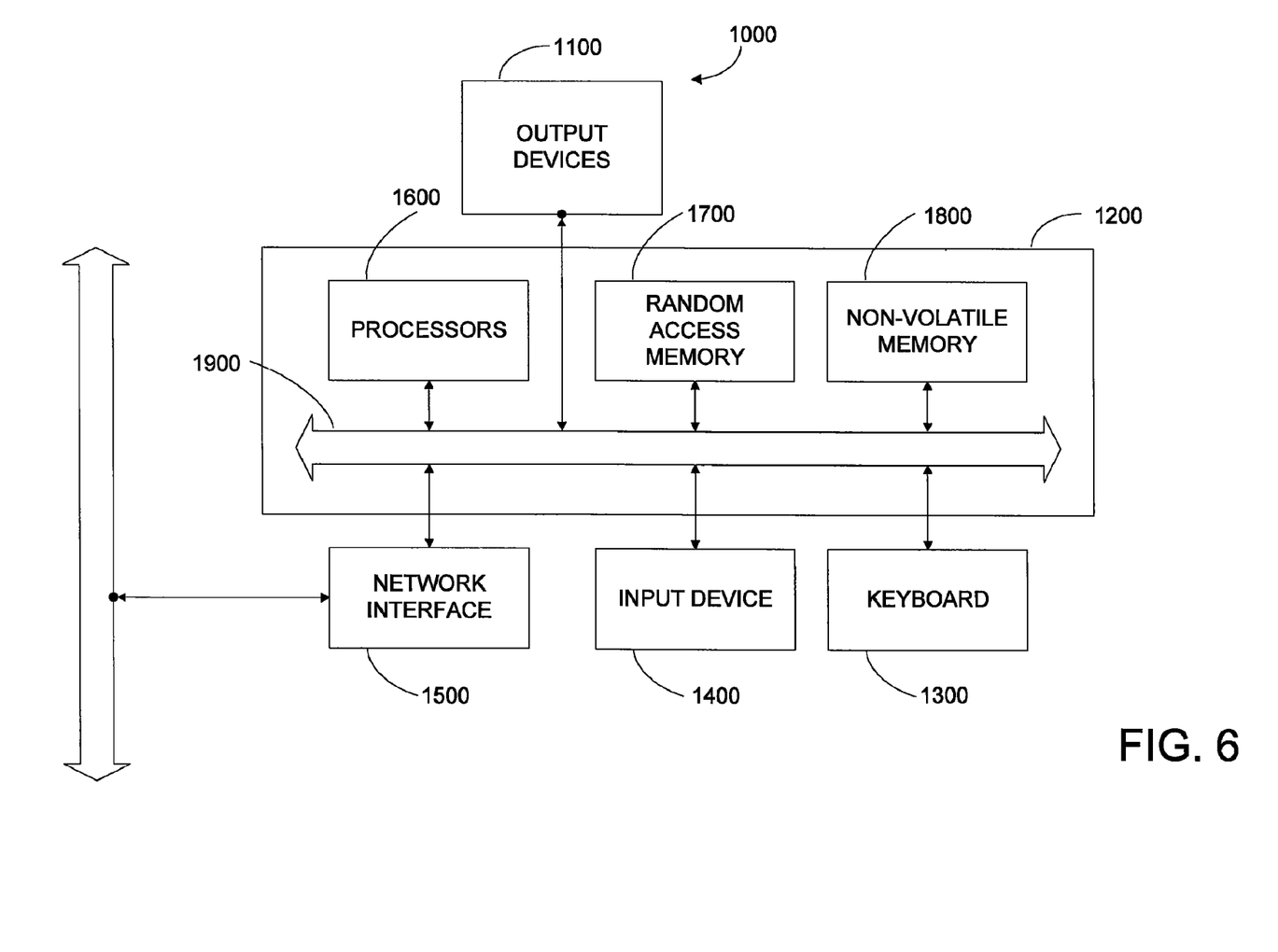
FIG. 6 illustrates a microprocessor system suitable for use with an embodiment of the invention.

FIG. 6 illustrates a computer system 1000 suitable for use with an embodiment of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 can include a computer mouse, a trackball, joystick, track pad, graphics tablet, touch screen, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processor 500 discussed above.

RAM 1700 and non-volatile memory 1800 are examples of tangible media for storage of data, audio/video files, computer programs, applet interpreters or compilers, virtual machines, and embodiments of the herein described invention. For example, embodiments of the above described processors may be represented as human-readable or computer-usable programs and data files that enable the design, description, modeling, simulation, testing, integration, and/or fabrication of integrated circuits and/or computer systems including embodiments of the invention. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the invention can use general-purpose programming or scripting languages, such as C or C++; hardware description languages, such as VHDL or Verilog; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes.

Further embodiments of computer 1200 can include specialized input, output, and communications subsystems for configuring, operating, simulating, testing, and communicating with specialized hardware and software used in the design, testing, and fabrication of integrated circuits.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the apparatus and method described herein may be included in a semiconductor intellectual property core, such as a microprocessor core (e.g. expressed as a hardware description language description or a synthesized netlist) and transformed to hardware in the production of integrated circuits. Additionally, embodiments of the invention may be implemented using combinations of hardware and software, including micro-code suitable for execution within a processor. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of arbitrating access to a resource, the method comprising:
   receiving resource requests;

storing the resource requests in a queue, wherein the queue comprises queue slots, wherein each queue slot stores one of the resource requests and is associated with a static priority and wherein at least one of the queue slots is associated with a token, wherein resource requests are assigned to random or arbitrarily selected available queue slots;

determining if a resource is available to service at least one of the resource requests;

initiating an arbitration cycle in response to the determination that the resource is available, wherein the arbitration cycle comprises:

selecting the at least one queue slot associated with the token;

selecting the resource request from the at least one selected queue slot if the at least one selected queue slot is storing one of the resource requests or a resource request from the queue slot that has the highest static priority for servicing; and associating at least one different queue slot with the token.

2. The method of claim 1, wherein storing resource requests in the queue comprises:

identifying at least one of the queue slots available to store resource requests;

selecting one of the identified queue slots; and storing one of the received resource requests in the identified queue slot.

3. The method of claim 2, wherein selecting one of the identified queue slots comprises:

selecting one of the identified queue slots having the highest static priority.

4. The method of claim 2, wherein selecting one of the identified queue slots comprises:

identifying a source of the one of resource requests;

determining a priority associated with the source;

selecting one of the identified queue slots having a static priority corresponding with the priority of the source.

5. The method of claim 4, wherein selecting one of the identified queue slots having a static priority corresponding with the priority of the source comprises:

determining if a first one of the queue slots reserved for the source is available to store resource requests;

selecting the first one of the queue slots in response to the determination that the first one of the queue slots reserved for the source is available to store resource requests; and selecting a different one of the identified queue slots in response to the determination that the first one of the queue slots reserved for the source is not available to store resource requests.

6. The method of claim 2, wherein selecting one of the identified queue slots comprises:

identifying a type of the one of resource requests;

determining a priority associated with the type;

selecting one of the identified queue slots having a static priority corresponding with the priority of the type.

7. The method of claim 6, wherein selecting one of the identified queue slots having a static priority corresponding with the priority of the type comprises:

determining if a first one of the queue slots reserved for the type is available to store resource requests;

selecting the first one of the queue slots in response to the determination that the first one of the queue slots reserved for the type is available to store resource requests; and selecting a different one of the identified queue slots in response to the determination that the first one of the queue slots reserved for the type is not available to store resource requests.

8. The method of claim 1, further comprising:

removing the selected resource request from the selected queue slot following the provision of the selected resource request to the resource.

9. The method of claim 8, further comprising:

receiving an indicator from the resource indicating that the resource request has been serviced; and removing the selected resource request from the selected queue slot in response to the indicator.

10. The method of claim 1 further comprising:

assigning a static priority to each of the queue slots according to the position of the queue.

11. The method of claim 1, further comprising:

initiating an additional arbitration cycle in response to the determination that the resource is available, wherein the additional arbitration cycle repeats the steps of selecting the queue slot associated with the token, determining if the selected queue slot is storing one of the resource requests, selecting the resource request of the selected queue slot in response to the determination that the selected queue slot associated with the token is storing one of the resource requests, selecting a resource request from the queue slot that has the highest static priority and is storing one of the resource requests if the determination is made that the queue slot associated with the token is not storing one of the resource requests, and providing the selected resource request to the resource.

12. The method of claim 11, wherein the additional arbitration cycle further comprises associating a different one of the queue slots with the token.

13. The method of claim 1 wherein the resource requests are requests to access a memory interface.

14. The method of claim 13 wherein the resource requests are requests to access a memory interface that is a cache memory interface.

15. The method of claim 1 wherein the resource requests are requests to access a bus interface.

16. The method of claim 1 wherein the resource requests are requests to access a processor adapted to perform a task specified by the resource requests.

17. The method of claim 1 wherein the resource requests are requests to access a system interface.

18. The method of claim 1, wherein associating a different one of the queue slots with the token comprises:

associating the token with a queue slot adjacent to the queue slot currently associated with the token in a sequence of queue slots.

19. A method of arbitrating access to a resource, the method comprising:

storing resource requests in a plurality of queue slots wherein each queue slot stores one of the resource requests and wherein each queue slot is associated with a static priority; wherein resource requests are assigned to random or arbitrarily selected available queue slots;

associating a token with one of the queue slots;

when the resource is available to service at least one of the resource requests, selecting the queue slot associated with the token if the selected queue slot is storing one of the resource requests and otherwise selecting a resource request from the queue slot that has the highest static priority and that is storing one of the resource requests;

providing the resource request associated with the selected queue slot to the resource; and associating a different one of the queue slots with the token.

20. The method of claim 19 wherein at least one queue slot is reserved for resource requests from a selected source.

21. A circuit for arbitrating access to a resource, the circuit comprising:
an interface including logic for receiving resource requests from at least one source;
a queue connected with the interface and comprising queue slots, wherein each queue slot includes logic for storing one of the received resource requests associated with a static priority; wherein resource requests are assigned to random or arbitrarily selected available queue slots;
a token association circuit including logic for storing data representing an association of a token with one of the queue slots of the queue; and
a priority multiplexer connected with the queue and the token association circuit and including:
first logic for selecting a resource request from a first one of the queue slots associated with the token in response to the determination that the first one of the queue slots is storing a resource request; and
second logic for selecting a resource request from a second one of the queue slots storing a resource request in response to the determination that the first one of the queue slots is not storing a resource request, the second one of the queue slots is storing a resource request, and the second one of the queue slots has a static priority higher than static priorities of any of the other queue slots storing resource requests.

22. The circuit of claim 21, wherein the token association circuit includes a shift register for storing a bit in shift register positions corresponding with the queue slots.

23. The circuit of claim 22, wherein the shift register shifts the bit to an adjacent one of the shift register positions, thereby associating the token with a different one of the queue slots.

24. The circuit of claim 21, wherein the token association circuit includes logic to modify the data representing the association of the token such that the token is associated with a different one of the queue slots.

25. The circuit of claim 21, further comprising output logic connected with the priority multiplexer to provide the selected resource request to a request servicer.

26. The circuit of claim 21, wherein the queue slots of the queue are arranged in a sequence and wherein each queue slot's position within the sequence corresponds to its static priority.

27. The circuit of claim 21, wherein the queue further includes third logic for removing the selected resource request from its queue slot in response to the selection of the resource request.

28. The circuit of claim 27, wherein the third logic removes the selected resource request from its queue slot in response to an indicator received from a request servicer indicating that the resource request has been serviced.

29. The circuit of claim 21, wherein the resource includes a memory interface.

30. The circuit of claim 29, wherein the memory interface is a cache memory interface.

31. The circuit of claim 21, wherein the resource includes a bus interface.

32. The circuit of claim 21, wherein the resource includes a processor performing a task specified by a resource request.

* * * * *